United States Patent [19]

Delapierre et al.

[11] 4,279,475
[45] Jul. 21, 1981

[54] METHOD OF CONTROL OF AN ELECTROLYTIC DISPLAY CELL AND A CIRCUIT FOR THE APPLICATION OF SAID METHOD

[75] Inventors: Gilles Delapierre, Seyssinet; Robert Meyer, Saint Ismier, both of France

[73] Assignee: Commissariat a l'Energie Atomique, Paris, France

[21] Appl. No.: 48,180

[22] Filed: Jun. 13, 1979

[30] Foreign Application Priority Data

Jun. 19, 1978 [FR] France .................................. 78 18222

[51] Int. Cl.³ .............................................. G02F 1/29
[52] U.S. Cl. .................................................. 350/363
[58] Field of Search .................................. 350/363, 357

[56] References Cited

U.S. PATENT DOCUMENTS 4,057,739 11/1977 Otake ..................................... 350/357

*Primary Examiner*—Stanley D. Miller, Jr.
*Assistant Examiner*—Leon Scott, Jr.

[57] ABSTRACT

A method of control for a metal halide electrolytic display cell consists in passing a control current through the cell in a first direction during periods of erasure and in the opposite direction during writing periods, a zero control current being maintained during periods of holding in the erased state and during periods of holding in the written state. A low leakage current is superimposed on the control current and passes through the cell in the first direction, at least during the periods of holding in the erased state.

3 Claims, 5 Drawing Figures

METHOD OF CONTROL OF AN ELECTROLYTIC DISPLAY CELL AND A CIRCUIT FOR THE APPLICATION OF SAID METHOD

This invention relates to a method of control of an electrolytic display cell and to a circuit for the operation of said display cell. The invention finds an application in the display of alphanumeric or analog characters.

In very broad terms, an electrolytic display cell comprises an electrolyte (usually a metal salt) inserted between semi-transparent electrodes of suitable shape and a counter-electrode. A voltage source serves to bring the electrodes to predetermined potentials in order to carry out either the deposition of a metallic film (for displaying a sign) or the re-solution of said film (for erasing the displayed sign).

In a display device of this type, the thickness of the deposited metallic film is directly proportional to the electric charge which has passed through the cell in the direction of writing. In order to effect complete erasure of said film, a charge of equal value must therefore pass through the cell but in the opposite direction. A charge deficiency at the time of erasure would give rise to an accumulation of metal on the electrode and, conversely, an excess of charge at the time of erasure would give rise to secondary reactions in the electrolyte.

Should the metal salt be a metal halide such as a silver halide (e.g. a silver halide such as silver iodide or silver bromide), the iodine or bromine which may be evolved in the electrolytic solution during the parasitic reactions mentioned above does not expose the device to any real hazard since it recombines with the silver of the deposited layers or with the silver of the counter-electrode.

This property and advantage of the silver halides are mentioned in particular in French Pat. No. 76 18919 of June 22, 1976 in the name of the present applicant.

Although an excess of charge at the time of erasure may therefore not constitute a disadvantage in regard to the composition of the electrolytic solution, it does nevertheless limit the speed of switching of the display device. If the display device is intended to have a uniform appearance, it is in fact preferable to wait until the entire quantity of iodine or bromine previously formed on the electrode has recombined chemically with the silver. The length of the waiting period corresponds to the charge overshoot, or extent to which the erasure charges have been exceeded.

In the final analysis, it is therefore endeavored to reduce said charge overshoot. However, two difficulties arise from this reduction, viz:

(1) It proves difficult in practice to achieve perfect equality of charges for both writing and erasing. The only simple means of doing so consists in supplying current through a capacitor in series with the display device as described in French Pat. No. 77 27851 filed on Sept. 15, 1977 and entitled "A method of control for an electrolytic display cell and a circuit for the application of said method". Although it proves satisfactory in regard to equality of writing and erasing charges, this solution is nevertheless attended by a disadvantage in that it entails the need for an electronic control circuit which cannot be integrated with current technology by reason of the presence of the capacitor;

(2) Experience shows that, whereas equality of writing and erasing charges would be conceivable in the case of a perfect cell, a real cell necessarily has defects (even though they may only be point defects and invisible to the naked eye) and silver is liable to prove more difficult to re-dissolve on such defects than in other locations. It is therefore desirable to allow the formation of iodine or bromine in a reasonable quantity in the vicinity of the electrodes in order to produce chemical re-solution of the few silver grains which have escaped from the principal electrochemical dissolution. It is therefore not possible in practice to reduce the charge overshoot completely to zero.

The present invention is precisely directed to a method and a device which utilize the beneficial effect of the presence of iodine or bromine (and more generally the presence of the halogen corresponding to the metal halide employed in the electrolyte) in the vicinity of the electrodes at the end of the period of erasure while permitting faster operation of the device. To this end, the invention contemplates the use of a low leakage current through the cell in the direction of erasure, at least during periods of holding in the erased state.

In more precise terms, the present invention has for its object a method of control of a metal halide electrolytic display cell in which an electric control current is passed through the cell in a first direction during periods of erasure and in the opposite direction during writing periods, a zero control current being maintained during periods of holding in the erased state and during periods of holding in the written state. The invention is distinguished by the fact that a low leakage current is superimposed on said control current and passes through the cell in said first direction, at least during the periods of holding in the erased state.

By "leakage current" is meant a current having values within the range of a few $nA/mm^2$ to a few tens of $nA/mm^2$.

In a first alternative embodiment, the writing and reading charges are equal, which can be achieved in particular by means of the charge and discharge of a capacitor as described in the patent cited earlier. In this alternative embodiment, the low leakage current is applied only to the erased segments.

In a more simple alternative embodiment, the leakage current is supplied to all the electrodes of the cell, that is to say both during the writing periods and during the erasing periods. It is necessary in this alternative embodiment to employ a leakage current such as to ensure negligible dissolution of silver on the written electrodes during the maximum time of retention of information. By way of example, the value of said current can be 10 $nA/mm^2$.

In addition to its simplicity, this alternative embodiment has the advantage of producing an overshoot at the end of the erasure which increases as the information varies more slowly. In fact the quantity of redissolved silver increases in proportion to the length of time the electrode has remained written.

As is clearly apparent from this second alternative embodiment, it is possible to employ an erasure charge of higher value than the writing charge in order to maintain a certain safety margin.

The present invention is further directed to a control circuit for a metal halide electrolytic display cell and for the practical application of the method hereinbefore defined. This circuit comprises means whereby an electric control current is passed through the cell in a first direction during erasure periods and a zero control current is maintained during periods of holding in the erased state and during periods of holding in the written state. The circuit under consideration essentially comprises in addition means whereby a low leakage current is superimposed on said control current and directed in said first direction, at least during periods of holding in the erased state.

The distinctive features and advantages of the invention will in any case be more clearly brought out by the following description of exemplified embodiments which are given by way of explanation and not in any limiting sense, reference being made to the accompanying drawings, wherein.

Figure 1:
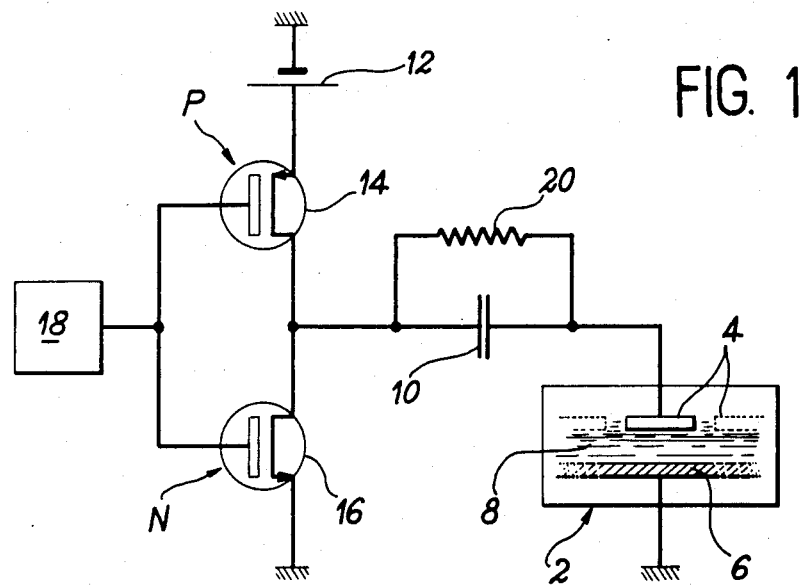
FIG. 1 is a diagram showing a circuit for applying a leakage current solely to erased electrodes.

The circuit shown in FIG. 1 serves to control an electrolytic display cell 2 constituted by a plurality of transparent electrodes 4, a counter-electrode 6 and an electrolytic solution 8. The circuit comprises a capacitor 10, a source 12 for producing a direct-current voltage having a value V, a p-type MOS transistor 14, a n-type MOS transistor 16, an electronic control circuit 18, a leakage resistor 20 having a value $R_f$ placed in parallel with the capacitor 10.

The operation of this circuit is as follows:

When the transistor 14 is triggered into conduction, the capacitor 10 is charged so as to produce a current through the cell in the direction of erasure; as long as the transistor 14 remains in the conductive state, the information is erased and the potential difference of the resistor 20 is of the order of $+V$. A low current in the vicinity of $V/R_f$ then flows through the cell in the direction of erasure.

In order to write an item of information, the transistor 14 is caused to cut-off and the transistor 16 is caused to conduct; the discharge current of the capacitor 10 then initiates the writing operation. When this situation continues to prevail and no generator is present in the loop comprising transistor 16, capacitor 10 and display cell 2, no current flows within the cell and this situation corresponds to a period of holding in the written state.

Figure 2:
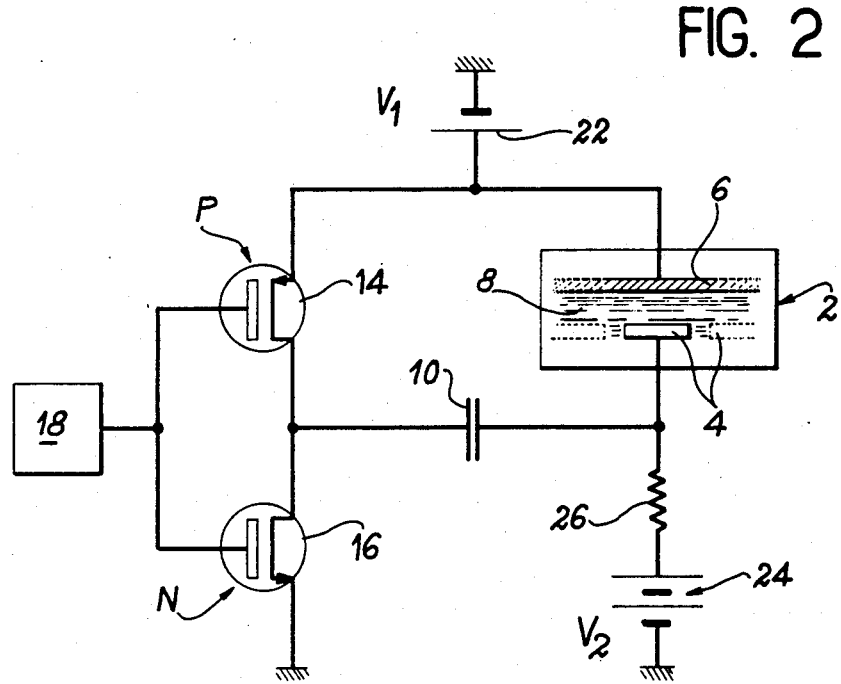
FIG. 2 is a diagram showing another circuit for continuously applying a leakage current in the event that the control circuit makes use of a charge and discharge capacitor.

The circuit shown in FIG. 2 is designed to operate an electrolytic display cell 2 which is identical with the cell of FIG. 1. This circuit further comprises a capacitor 10, a p-type MOS transistor 14, a n-type MOS transistor 16 and a control circuit 18. The operation of this assembly is identical with that of FIG. 1. The circuit which is illustrated in the figure further comprises a first voltage source 22 having a value $V_1$ and a second voltage source 24 having a value $V_2$ which is higher than $V_1$. A resistor 26 having a value $R_f$ is placed between the second source 24 and the cell. A small erasure current having the value $(V_2-V_1)/R_f$ therefore flows continuously within the cell.

Figure 3:
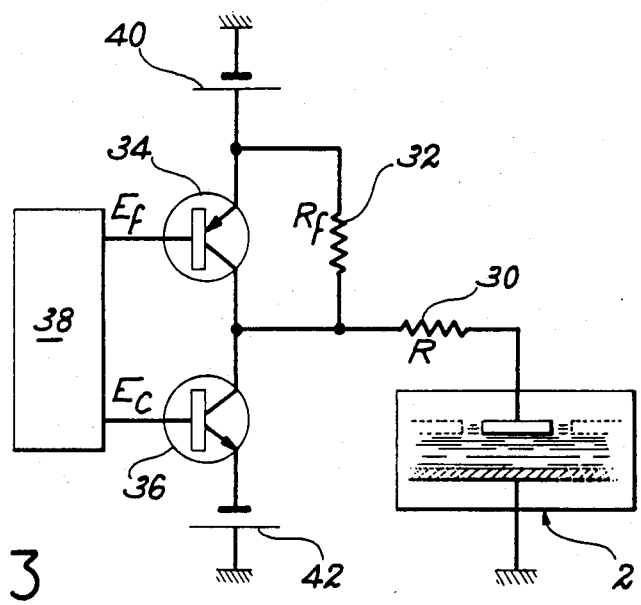
FIG. 3 is a diagram showing a circuit for continuously applying a leakage current in the case of a conventional control circuit.

The circuit shown in FIG. 3 supplies an electrolytic display cell 2 and comprises a resistor 30 having a value R, a leakage resistor 32 having a value $R_f$ which is considerably higher than R, a pnp-type transistor 34, a npn-type transistor 36, a control circuit 38 for said transistors, a voltage source 40 having a value $+V$ and a voltage source 42 having a value $-V$. The transistor 34 is controlled by a signal carried by an erasure lead Ef which is connected to the base of the transistor. The transistor 36 is controlled by another signal carried by a writing lead Ec which is also connected to the base of the transistor. The circuit 38 applies to the leads Ef and Ec voltages which are equal either to $+V$ or to $-V$, depending on whether it is desired to obtain a period of writing, erasure or storage. The table given hereunder serves to define the state of control as a function of applied voltages:

| Ef | Ec | STATE |
| --- | --- | --- |
| $+V$ | $+V$ | writing |
| $-V$ | $-V$ | erasure |
| $+V$ | $-V$ | storage |

The presence of the resistor 32 having a value $R_f$ calls for the presence of a low current of the order of $V/R_f$ in the direction of erasure. The resistor 32 may be replaced by a suitably dimensioned transistor if necessary.

Figure 4:
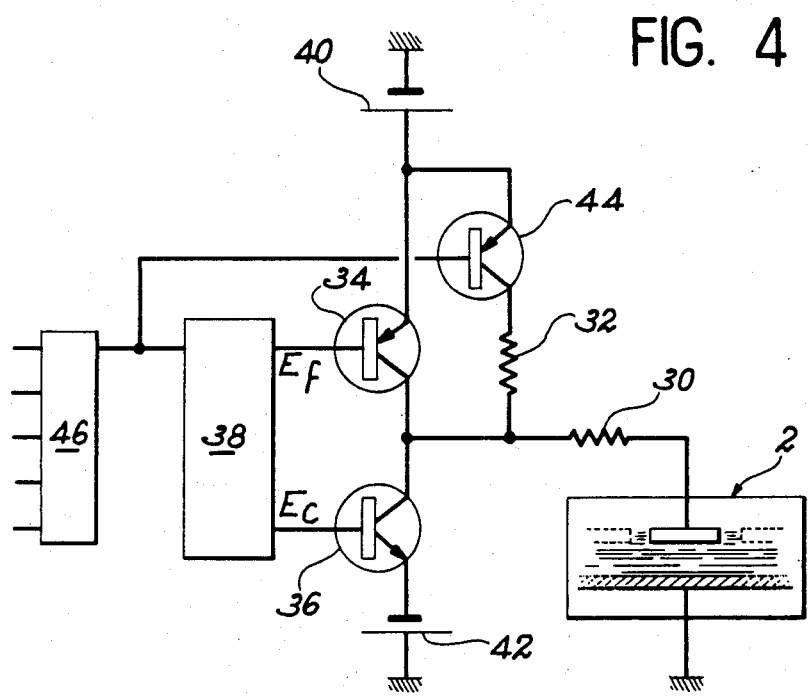
FIG. 4 shows an alternative embodiment of the circuit aforesaid in which the leakage current is interrupted outside the periods of erasure.

The circuit shown in FIG. 4 comprises the same elements as in the previous figure but is provided in addition with a transistor 44 for interrupting the leakage current in certain cases. To this end, the base of said transistor is connected to a decoder 46 which supplies the control circuit 38 in known manner. This decoder delivers "1" or "0" voltage signals to the circuit 38 in order to ensure that this latter delivers suitable voltages to the leads Ef and Ec as described in the table given above. By way of example, the circuit 46 delivers a "0" in the case of an electrode to be erased and a "1" in the case of an electrode to be written. In the case which is illustrated, the transistor 44 is cut off (and the leakage current is then interrupted) when the electrode is in a writing period.

Figure 5:
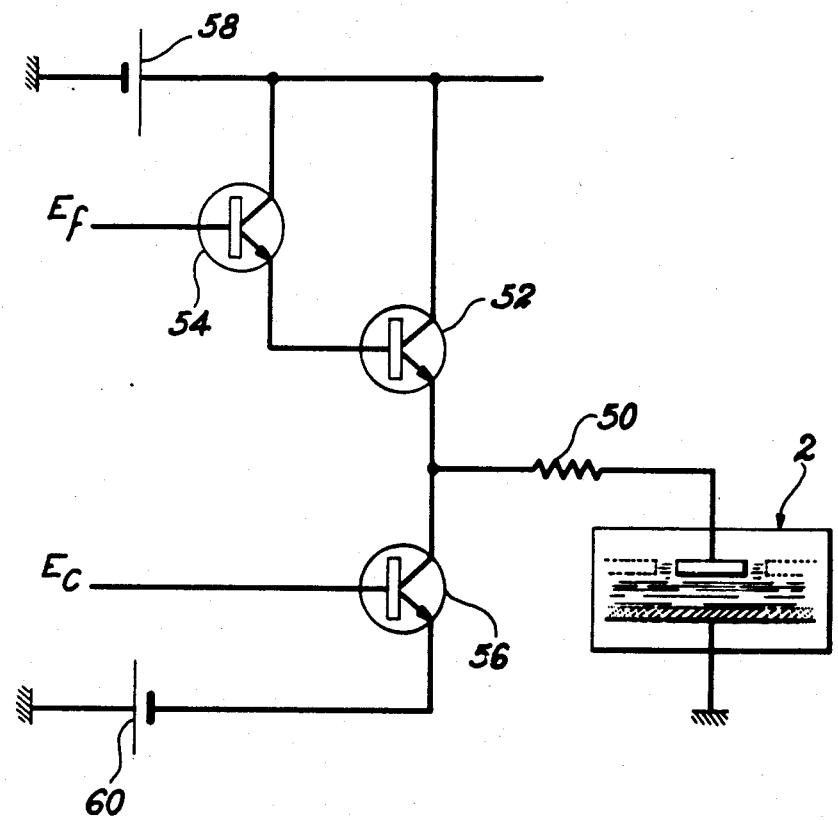
FIG. 5 shows an embodiment of a circuit for continuously maintaining a voltage of about 0.7 V on the electrode to be erased or an erased electrode.

The circuit shown in FIG. 5 comprises a resistor 50, erasing transistors 52 and 54, a writing transistor 56, two dry cells 58 and 60 having a voltage of approximately 1.5 V and two erasure and writing control leads Ef and Ec.

The emitter-base voltage drop of the erasure transistors 52 and 54 is approximately 0.4 V in the case of a low emitter current, thus allowing a voltage of approximately 0.7 V to remain in the display device 2, this value being slightly higher than the voltage which is necessary for the electrochemical formation of iodine on the electrode. By means of a circuit of this type, an electrode to be erased or an erased electrode can thus be continuously maintained at a voltage of the order of 0.7 V, thus producing a fairly high current through the cell as long as a silver layer covers the electrode and dissolution takes place, and a low leakage current as soon as the silver layer has been removed.

The application of an erasure voltage which is slightly higher than the halogen formation voltage in order to initiate erasure of a metal halide electrolytic display cell is disclosed in French patent Application No EN 78 18223 filed on June 19, 1978.

This erasure voltage can also be controlled in dependence on the impedance of a reference electrode placed within the cell as described in French patent Application No EN 78 18224 filed on June 19, 1978.

We claim:

1. A display device comprising an electrolytic display cell provided therein with a plurality of transparent electrodes, a counter-electrode and an electrolytic solution containing a metal halide electrolyte, and a control circuit, said control circuit comprising first means for delivering any one of three currents:
   (1) a writing current having a first direction to facilitate the deposition of a metallic film on the electrodes of the display cell;
   (2) an erasure current having a second direction opposite to said first direction to facilitate disolving said metallic film; and
   (3) a zero current to facilitate storage of the display; and wherein said control circuit further comprises second means for delivering a leakage current at least when said zero current is delivered by said first means, said leakage current having a direction corresponding to said erasure current in said second direction.

2. A display device according to claim 1 wherein said second means for generating the leakage current is continuously connected to the cell.

3. A display device according to claim 1 wherein said first means comprises a circuit for charging and discharging a capacitor through said cell.

* * * * *